United States Patent [19]

Tatters et al.

[11] 4,389,922
[45] Jun. 28, 1983

[54] REVERSING LOW PRESSURE LUBRICATING VALVE

[75] Inventors: Ronald Tatters; John E. Dolman, both of Victoria, Canada; Donald R. Howell, deceased, late of Victoria, Canada, by June E. Howell, executrix

[73] Assignee: Her Majesty the Queen in right of Canada as represented by the Minister of Defence, Ottawa, Canada

[21] Appl. No.: 294,545

[22] Filed: Mar. 20, 1981

[30] Foreign Application Priority Data

Sep. 26, 1980 [CA] Canada .................................. 361479

[51] Int. Cl.³ .............................................. F01B 31/10
[52] U.S. Cl. ...................................... 92/156; 92/160; 184/18
[58] Field of Search ................ 92/86.5, 156, 153, 160, 92/158, DIG. 2; 91/46, 234; 184/18

[56] References Cited

U.S. PATENT DOCUMENTS

| 2,398,910 | 4/1946 | Pontius ................................... 92/156 |
| 2,495,516 | 1/1950 | Foster ................................ 184/18 X |
| 3,168,013 | 2/1965 | Williamson ........................... 92/160 |
| 3,216,334 | 11/1965 | Bauer .................................... 92/160 |

*Primary Examiner*—Paul E. Maslousky
*Assistant Examiner*—A. M. Bradley
*Attorney, Agent, or Firm*—Cushman, Darby & Cushman

[57] ABSTRACT

A lubricating valve for a moveable piston, the valve supplying lubricant at low pressure and being reversible automatically in response to a reversal of the higher pressure which drives the piston.

9 Claims, 1 Drawing Figure

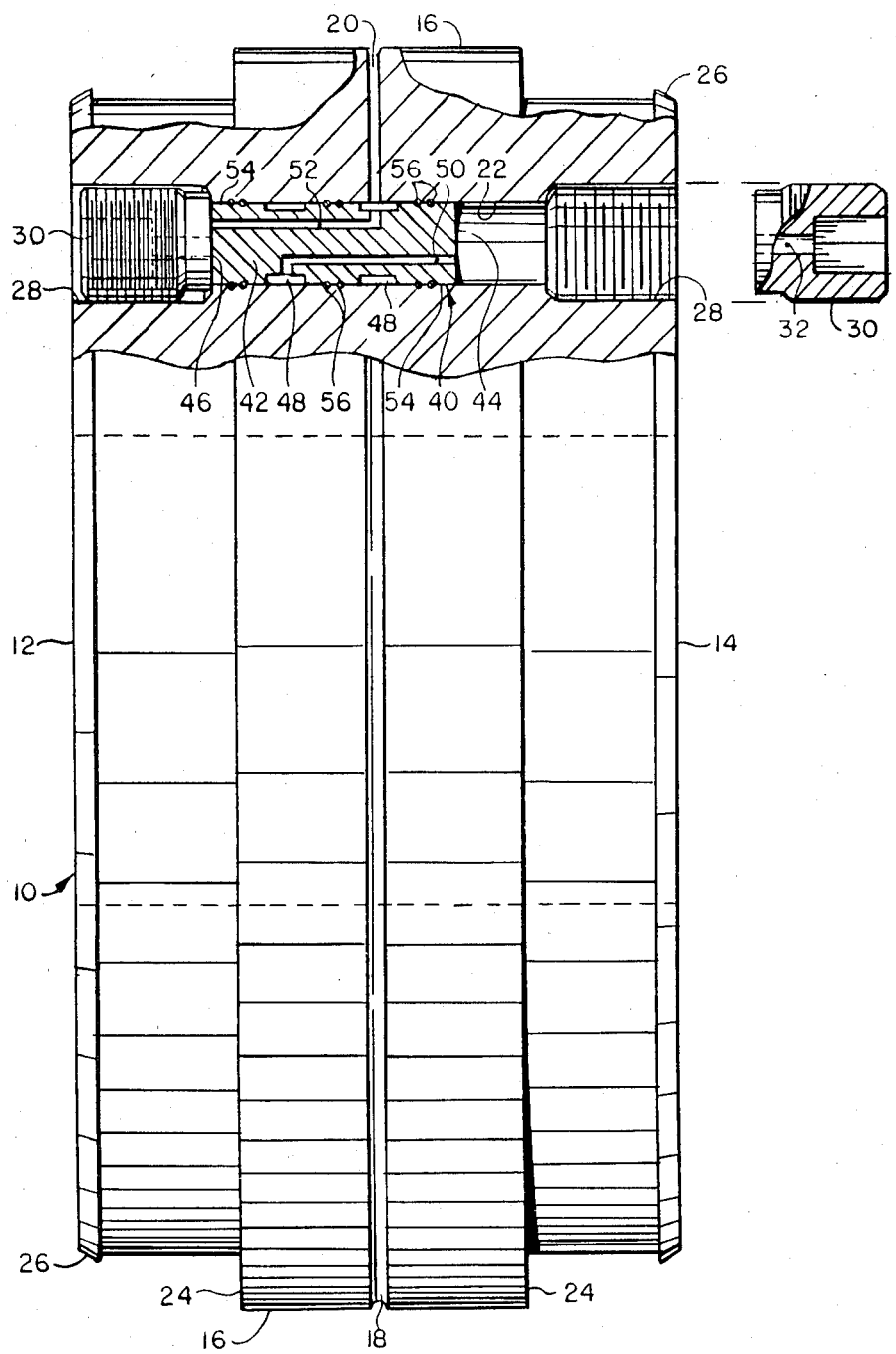

REVERSING LOW PRESSURE LUBRICATING VALVE

This invention relates to a lubricating valve, particularly to such a valve adapted for use in the piston, for example, of a double acting piston and cylinder combination.

BACKGROUND OF THE INVENTION

The uses of piston and cylinder combinations are numerous, and will be well known to many readers. Typically, the piston is actuated by the pressure developed in a fluid in the cylinder. Consequently, in moving, the piston itself moves a boom, a linkage, a plate, or the like. To function properly the piston must be adequately sealed within the cylinder. At the same time, the piston must be easily moveable within the cylinder, i.e., without generating excessive amounts of friction.

Reliable lubrication must therefore be provided, to inhibit premature failure of, say, actuator pistons and/or piston seals. Such a failure can naturally have serious consequences. Efforts in the past have not always provided satisfactory solutions.

Accordingly, the present invention is thought to provide a significant improvement to previous problems related to the inadequate lubrication of seals in a piston and cylinder combination. The invention described herein is relatively simple both in construction and operation. Thus, it is very reliable.

BRIEF DESCRIPTION OF THE DRAWINGS

The attached FIGURE is an elevational view taken partially in longitudinal cross-section showing schematically a typical double-acting piston in which the present invention is used.

DESCRIPTION OF THE INVENTION

This invention therefore provides a lubricating valve for use in a moveable piston having an internal chamber extending through the same, the piston also having a supply groove extending peripherally thereof and an internal channel which interconnects the chamber with the supply groove, the lubricating valve comprising a body adapted to be closely received in the internal chamber and slidably moveable therein, the body including two oppositely disposed end faces; a plurality of distribution channels extending peripherally of the body; and a plurality of feed holes in the body corresponding to the distribution channels, each feed hole functioning to interconnect a related one of the channels with one of the end faces and a portion of the internal chamber adjacent to it; such that a high pressure on one or other side of the piston causes the valve to be moved in the direction of lower pressure while the distribution channels enable a lubricant to be conducted from the low pressure side of the internal chamber to the peripheral supply groove to lubricate the walls of a cylinder in which the piston is moveable.

By a more preferred embodiment, this invention also provides a lubricating valve for use in a piston that is reciprocally moveable in a cylinder, such piston having an internal supply chamber therein extending therethrough and an internal channel which interconnects the chamber with a supply groove disposed peripherally of the piston, the lubricating valve comprising; a body adapted to be closely received in the supply chamber and moveable therein, the body having two oppositely disposed end faces; a plurality of distribution channels on the exterior of the body, the distribution channels being separated one from another by lands, with both the channels and lands extending peripherally of the body; and a plurality of feed holes in the body, corresponding in number to the distribution channels, each feed hole interconnecting one distribution channel to one end face of the body and a portion of the supply chamber adjacent to that face whereby, a higher pressure on one side of the piston moves the latter in the direction of lower pressure thus enabling a lubricant in the low pressure side of the chamber to be conducted to one of the distribution channels and from the latter to the supply groove on the piston to lubricate walls of the piston and cylinder, the movement of the valve being reversible automatically upon a reversal of the high and low pressure sides of the cylinder.

The various features and advantages of this invention will become apparent from the following detailed description. Such description is to be read in conjunction with the accompanying drawing FIGURE.

That FIGURE is an elevation view taken partly in longitudinal cross-section showing schematically a typical double acting piston in which the present invention is used.

DETAILED DESCRIPTION OF THE DRAWING

The reference numeral 10 identifies a typical piston which is adapted to be closely housed within a cylinder, not shown. There normally is a link, shaft or other connecting element to which the piston 10 is secured, to effect movement of another item in response to movement of the piston. Those forms of connecting elements have been omitted here along with any description thereof as they do not contribute to an understanding of the present invention.

It will suffice to describe the piston 10 as having end faces 12 and 14 and side wall 16. The side wall 16 is provided with at least one supply groove 18 which extends peripherally thereof. The groove 18 connects to an internal channel 20 and through that to an internal chamber 22. The side wall 16 is formed with steps or shoulders 24. These shoulders 24 are adapted to seat sealing means in the form of piston or O-rings, or the like, not shown. Retaining means in the form of outwardly extending flanges 26 aid in securing the sealing means in place. The flanges 26 are conveniently formed as radial extensions of end faces 12 and 14.

The internal chamber 22 is formed as a bore, usually circular in cross-section, which extends through piston 10 from one to the other of end faces 12 and 14. The ends of chamber 22 adjacent the end faces 12 and 14 are diametrically enlarged, and internally threaded as at 28 to receive set screws 30. Each set screw 30 is provided with a centrally disposed hole 32 which extends through the same. This hole 32 is of a predetermined size, i.e., cross-sectional area as will be apparent shortly.

The chamber 22 is adapted to closely and slidably receive a lubricating valve 40. This valve 40 has a body 42 with oppositely disposed end faces 44 and 46. The sides of the body 42 are provided with a plurality of distribution channels 48 that extend peripherally of the valve body 42. Each channel 48 connects to a related feed hole 50, 52 within the body 42. The feed holes 50 and 52 terminate in end faces 44 and 46. Thus, the distribution channels 48 interconnect through holes 50, 52 to those portions of internal chamber 22 immediately adjacent end faces 44 and 46.

Between the end faces 44, 46 and distribution channels 48, as well as between the latter, are lands 54. These are each perferably formed with one or more grooves in which sealing means in the form of O-rings 56 or the like may be seated. These O-rings 56 will prevent cross-communication between channels 48 and chamber 22. The drawing also shows the channels 48, end faces 44, 46 and lands 54 as being oriented at right angles to the longitudinal central axis of the valve 10 (or chamber 22 for that matter). This often is the most convenient orientation to use, but is optional and at the manufacturer's discretion.

In the context of operation in a hydraulically actuated piston/cylinder combination, it will be seen that lubricant can be conducted from the cylinder on either side of the piston 10 through to supply groove 18. This occurs through hole(s) 32 in set screws 30 into internal chamber 22, from there via holes 50, 52 into one of the distribution channels 48. Whenever one of these channels 48 is aligned with internal channel 20, lubricant can be conducted to supply groove 18, to supply lubrication to the piston and cylinder interface, as desired.

The lubricating valve 40 is freely moveable in chamber 22. Thus, if piston 10 is moving (or tending to move) from right to left, as seen in the drawing, a higher driving pressure exists adjacent face 14 than adjacent face 12. In other words, the high pressure side of piston 10 is at face 14, while the low pressure side is at face 12. The hole 32 of set screw 30 in face 14 then becomes operative to transmit the same higher driving pressure into chamber 22. That high pressure will then move valve body 42 from right to left until channel 48 lines up with internal channel 20 to bring the latter into communication with chamber 22 adjacent face 46, and low pressure. That occurs when valve body 42 butts up against the set screw 30 represented by the parts being positioned as shown in the drawing. Low pressure lubricating fluid can be conducted through to supply groove 18 and thus provide lubrication of the cylinder wall over which piston 10 is moving.

In accordance with this invention, when the higher driving pressure is reversed, that is supplied to the cylinder on the opposite side of piston 10, i.e., adjacent face 12, that same pressure will automatically cause movement of the lubricating valve 40 to be reversed. That is, valve body 42 is caused to move from left to right so that again the lower pressure lubricating fluid can be transmitted or conducted through to the piston/cylinder interface. This occurs when the other distribution channel 48 comes into alignment with internal channel 20.

The foregoing construction is susceptible to some changes as will be evident to those skilled in this art. It is intended by this invention to encompass all those changes and modifications which fall within the scope of the claims below.

The embodiments of the invention in which an exclusive property or privilege is claimed are defined as follows:

1. A lubricating valve for use in a moveable piston having an internal chamber extending through the same, the piston also having a supply groove extending peripherally thereof and an internal channel which interconnects the chamber with the supply groove, said lubricating valve comprising:
   (a) a body adapted to be closely received in said internal chamber and slidably moveable therein responsive to pressure changes in said internal chamber, said body including two oppositely disposed end faces, said internal chamber, in operation, having alternatively a low pressure side and a high pressure side;
   (b) a plurality of distribution channels extending peripherally of the body; and
   (c) a plurality of feed holes in said body corresponding to the distribution channels, each feed hole functioning to interconnect a related one of said distribution channels with one of said end faces and a portion of the internal chamber adjacent to it; such that a high pressure on one or other side of the piston causes said valve to be moved within said internal chamber in the direction of lower pressure while said distribution channels enable a lubricant to be conducted from the low pressure side of said internal chamber to the peripheral supply groove to lubricate the walls of a cylinder in which said piston is moveable.

2. The lubricating valve defined in claim 1, wherein said body includes lands adjacent said distribution channels, and said lands are provided with sealing means thereon which inhibit cross-communication of a lubricant between the distribution channels.

3. The lubricating valve defined in claim 2, wherein said sealing means includes grooves formed in the lands and O-rings seated in said grooves.

4. The lubricating valve defined in claim 1, 2 or 3 wherein said distribution channels are disposed at right angles to a central longitudinal axis of said body.

5. The lubricating valve defined in claim 2 or 3, wherein the distribution channels and lands adjacent them are disposed at right angles to a central longitudinal axis of the body.

6. A lubricating valve for use in a piston that is reciprocally moveable in a cylinder, such piston having an internal supply chamber therein extending therethrough said internal supply chamber having, in operation, alternatively a low pressure side and a high pressure side and an internal channel which interconnects the chamber with a supply groove disposed peripherally of the piston, the lubricating valve comprising:
   (a) a body adapted to be closely received in said supply chamber and moveable therein responsive to pressure changes in said supply chamber, said body having two oppositely disposed end faces;
   (b) a plurality of distribution channels on the exterior of said body, the distribution channels being separated one from another by lands, with both said channels and lands extending peripherally of the body; and
   (c) a plurality of feed holes in said body, corresponding in number to the distribution channels, each said feed holes interconnecting one distribution channel to one end face of said body and a portion of the supply chamber adjacent to that face, whereby, a higher pressure on one side of the piston moves the latter in the direction of lower pressure thus enabling a lubricant in the low pressure side of said chamber to be conducted to one of said distribution channels and from the latter to the supply groove on said piston to lubricate walls of the piston and cylinder.

7. The lubricating valve defined in claim 6, wherein said lands and distribution channels are disposed generally at right angles to a longitudinal axis of said body.

8. The lubricating valve defined in claim 6 or 7, wherein sealing means are provided on said lands to prevent cross-communication of lubricant from one distribution channel to another and to the end faces of said body.

9. The lubricating valve defined in claim 1, 2 or 6, wherein said body has a circular cross-section.

* * * * *

UNITED STATES PATENT AND TRADEMARK OFFICE
CERTIFICATE OF CORRECTION

PATENT NO. : 4,389,922
DATED : June 23, 1983
INVENTOR(S) : TATTERS, et al.

It is certified that error appears in the above-identified patent and that said Letters Patent are hereby corrected as shown below:

On the title page, Item [22], "Mar. 20, 1981" should read -- Aug. 20, 1981 --.

Signed and Sealed this

Twenty-fourth Day of July 1984

[SEAL]

Attest:

GERALD J. MOSSINGHOFF

Attesting Officer  Commissioner of Patents and Trademarks